A. BERG.
ANGLE MEASURING INSTRUMENT.
APPLICATION FILED MAY 21, 1919.
1,341,036.
Patented May 25, 1920.
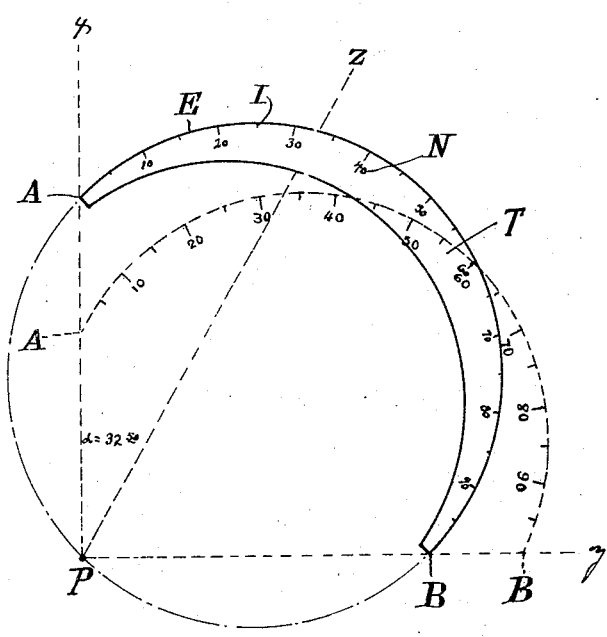
Inventor
Albert Berg
by Laurence Langner
Atty

UNITED STATES PATENT OFFICE.

ALBERT BERG, OF HÖNEFOS, NORWAY.

ANGLE-MEASURING INSTRUMENT.

1,341,036.  Specification of Letters Patent.  Patented May 25, 1920.

Application filed May 21, 1919. Serial No. 298,687.

*To all whom it may concern:*

Be it known that I, ALBERT BERG, a subject of the King of Norway, residing at Hönefos, Norway, have invented certain new and useful Improvements in Angle-Measuring Instruments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to geometrical instruments, and more particularly to a new instrument for measuring or plotting acute angles.

This new instrument is particularly advantageous, in practice, in measuring a given angle contained within a right-angle, for the reason that it is merely necessary to place the instrument so that the ends of its crescent-shaped body shall fall on the lines of the right-angle and thereafter reading the angle on a scale divided to indicate the number of degrees contained within a right-angle. The instrument can be employed in cases where it is impossible or impractical to measure or determine an angle contained within a right-angle by instruments heretofore known; and in use it is not necessary that the instrument be placed in the angle in a particular position either with relation to the origin or lines thereof so long as the extremities of the horns of the crescent-shaped body fall on the lines defining the right-angle.

The accompanying drawing shows the instrument in its present preferred form, and also shows the manner in which it may be used. In dotted lines, the instrument is shown in another position within the right-angle to illustrate that the instrument will indicate the angles contained therein so long as the extremities fall on the lines defining the right-angle.

In the form which is at present preferred, the instrument comprises a crescent-shaped body T of transparent material. The convex edge E of this body is provided with graduations I, equi-distantly disposed along its entire length and dividing said length into a number of degrees equal to the number of degrees contained within a right-angle. These graduations I are provided with numerals N to facilitate the reading of an angle sought or to be measured, and in the form illustrated the graduations are arranged according to a centesimal system, according to which the circle is divided into four hundred degrees or increments; but it should be understood that the invention is equally applicable to any other system, such as the one most commonly used in which the circle is divided into three hundred and sixty degrees. The semi-circular edge E, in the present instrument, is not divided into the number of degrees contained in a straight angle of the semi-circle, because the instrument is primarily intended to be used for measuring and determining the number of degrees contained within a right-angle and because of the manner in which it is to be used in measuring and determining the degrees contained within a right-angle. The entire semi-circular edge E, of the instrument is, however, divided into the number of degrees contained within a right angle.

The instrument is illustrated to show its use in connection with a rectangular coördinate system comprising the lines $x$ and $y$ defining the right-angle having an origin P. If it is desired to measure the angle defined by the line $x$ and the line $z$, the instrument is placed on the figure so that its pointed extremity A falls on the line $x$ and so that its other point B simultaneously falls on the line $y$. The angle is then read from the graduations I according to the position of the line $z$ relative thereto. In the case illustrated, this angle is 32.50°, as indicated.

It will be noted that the position of the instrument, as shown in dotted lines in the figure, is different relatively to the lines $x$ and $y$, the points A and B thereof, however, falling on the lines $x$ and $y$ as in the full line position; but nevertheless the reading of the graduations I shows the same angle, namely 32.50°, defined by the lines $x$ and $z$. The instrument, therefore, will measure and determine angles within a right-angle without reference to the origin of the angle or without any particular relation of the instrument to the lines $x$ or $y$, it only being necessary that the extremities A and B of the instrument shall fall on the lines at some point therein.

The maximum graduation is located at one extremity of the crescent, point B; and the minimum graduation is located at the other extremity of the crescent, point A.

I claim as my invention:—

1. An instrument of the class described, comprising a plate having an arcuate edge equal to a semi-circle, said edge being graduated, and having numerals adjacent certain of the graduations, each numeral corresponding to one half of the value of the angle included between lines drawn from the center of the arc of the edge respectively to one end of the semi-circle and the graduation to which the numeral is applied.

2. An instrument of the class described comprising a plate having graduations arranged in an arc equal to a semi-circle and having numerals adjacent certain of said graduations, each numeral corresponding to one half the value of the angle included between lines drawn from the center of the arc of said graduation respectively to one end of the semi-circle and the graduation to which the numeral is applied.

In testimony that I claim the foregoing as my invention, I have signed my name in presence of two subscribing witnesses.

ALBERT BERG.

Witnesses:
A. HEDEWSCHAIR,
A. B. COOK.